(12) United States Patent
Joyner

(10) Patent No.: US 11,650,892 B1
(45) Date of Patent: May 16, 2023

(54) RESILIENT COORDINATION, COMMAND, AND CONTROL OF WIDELY DISTRIBUTED TEST AGENTS

(71) Applicant: Spirent Communications, Inc., San Jose, CA (US)

(72) Inventor: David Joyner, Raleigh, NC (US)

(73) Assignee: Spirent Communications, Inc., San Jose, CA (US)

( * ) Notice: Subject to any disclaimer, the term of this patent is extended or adjusted under 35 U.S.C. 154(b) by 215 days.

(21) Appl. No.: 17/225,940

(22) Filed: Apr. 8, 2021

(51) Int. Cl.
*G06F 11/26* (2006.01)
*H04L 43/50* (2022.01)
*H04L 67/141* (2022.01)
*H04L 67/1001* (2022.01)

(52) U.S. Cl.
CPC .............. *G06F 11/26* (2013.01); *H04L 43/50* (2013.01); *H04L 67/1001* (2022.05); *H04L 67/141* (2013.01)

(58) Field of Classification Search
CPC ...... G06F 11/26; H04L 67/1001; H04L 43/50; H04L 67/141
See application file for complete search history.

(56) References Cited

U.S. PATENT DOCUMENTS

| | | | | |
|---|---|---|---|---|
| 8,935,669 | B2 * | 1/2015 | Neethiraj | G06F 11/2294 717/124 |
| 9,983,988 | B1 * | 5/2018 | Quadros | G06F 11/3692 |
| 10,671,520 | B1 * | 6/2020 | Rodrigues | H04L 41/0806 |
| 10,701,091 | B1 * | 6/2020 | Cunningham | G06F 21/554 |
| 2003/0051186 | A1 * | 3/2003 | Boudnik | G06F 11/3688 717/124 |
| 2013/0103749 | A1 * | 4/2013 | Werth | H04L 41/0816 709/203 |
| 2014/0130111 | A1 * | 5/2014 | Nulty | H04N 21/6118 725/107 |
| 2017/0078886 | A1 * | 3/2017 | Raleigh | H04W 12/086 |
| 2017/0366421 | A1 * | 12/2017 | Dam | H04L 43/06 |

(Continued)

FOREIGN PATENT DOCUMENTS

| | | | | |
|---|---|---|---|---|
| WO | WO-2021021267 A1 | * | 2/2021 | H04L 41/046 |
| WO | WO-2022104396 A1 | * | 5/2022 | |

*Primary Examiner* — Matthew M Kim
*Assistant Examiner* — Indranil Chowdhury
(74) *Attorney, Agent, or Firm* — Haynes Beffel & Wolfeld, LLP; Ernest J. Beffel, Jr.

(57) ABSTRACT

Disclosed is using service-based controllers to manage test agents and performance of multi-agent tests running on a network, a connection-interrupted agent losing connection to a first controller, calling home after the loss, and being connected to a second controller which, after being connected to the agent, accesses a list of active tests which should be running, directing the agent to stop running tests that are not on the list and receiving from the agent a state report on running tests on the list. Additionally, instantiating and setting states of fresh primary and peer coordination FSMs using the state report from the test agent, establishing coordination interactions with additional controllers of additional test agents that are participating with the connection-interrupted agent in the active tests, and the connection-interrupted agent continuing to conduct active tests and directing results to the second controller without need to tear down and restart the active tests.

20 Claims, 9 Drawing Sheets

(56) References Cited

U.S. PATENT DOCUMENTS

| | | | | |
|---|---|---|---|---|
| 2018/0338187 A1* | 11/2018 | Ketonen | ............... | H04W 24/04 |
| 2019/0065352 A1* | 2/2019 | Patel | ................... | G06F 11/3664 |
| 2019/0296997 A1* | 9/2019 | Menon | ................... | H04L 43/16 |
| 2022/0066851 A1* | 3/2022 | Ahmed | ................. | G06F 11/079 |
| 2022/0066916 A1* | 3/2022 | McQuee | ................. | G06F 9/451 |

* cited by examiner

RESILIENT COORDINATION, COMMAND, AND CONTROL OF WIDELY DISTRIBUTED TEST AGENTS

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Testing continues to be in great demand for networks and systems. More specifically, testing of physical networks, virtual networks, cloud platforms, data access networks and services requires management of configured tests, scheduling of tests, real-time command and control over tests, and real-time collection of test-related events, such as progress and result events, for tens of thousands to millions of network nodes in a system.

An opportunity arises to enable topology-aware active measurement of physical networks, virtualized infrastructure networks, cloud platforms, data access networks and services. This opportunity extends to managing test agents and performance of multi-agent tests by the test agents distributed over a network that has ten thousand network nodes, and in some cases tens of millions of network nodes.

SUMMARY

The technology disclosed addresses using service-based controllers, with a first service-based controller and a second service-based controller, to manage numerous test agents and performance of multi-agent tests involving exchanges among the test agents running on a widely distributed network of nodes. The network of nodes can be connected via a wide area network in one use case, and can be connected via a local area network in another case. The disclosed technology includes a connection-interrupted test agent that is running a plurality of the multi-agent tests losing connection to the first service-based controller, calling home after the loss of connection, and being connected to the second service-based controller. Also included is the second service-based controller, after being connected to the connection-interrupted test agent, accessing a list of currently active tests, which the connection-interrupted test agent should be running, directing the connection-interrupted test agent to stop running at least tests that are not on the list of currently active tests, if any, and receiving from the connection-interrupted test agent a state report on at least running tests that are on the list of currently active tests. The disclosed technology further includes instantiating fresh primary and peer coordination finite state machines (FSMs) and setting states of the fresh primary and peer coordination FSMs using the state report received from the connection-interrupted test agent, and establishing coordination interactions with additional service-based controllers of additional test agents that are participating with the connection-interrupted test agent in the currently active tests. Additionally included is the connection-interrupted test agent continuing to conduct the currently active tests and directing results of the currently active tests to the second service-based controller without need to tear down and restart the currently active tests.

Particular aspects of the technology disclosed are described in the claims, specification and drawings.

INCORPORATION BY REFERENCE OF FILE SUBMITTED ELECTRONICALLY WITH APPLICATION

The following file in ASCII text format is submitted with this application as Appendix A and is incorporated by reference.

| File name | Creation dates | Sizes: |
|---|---|---|
| TLA Program Listing Appendix | Feb. 11, 2021 | 99 KB. |

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Figure 1:
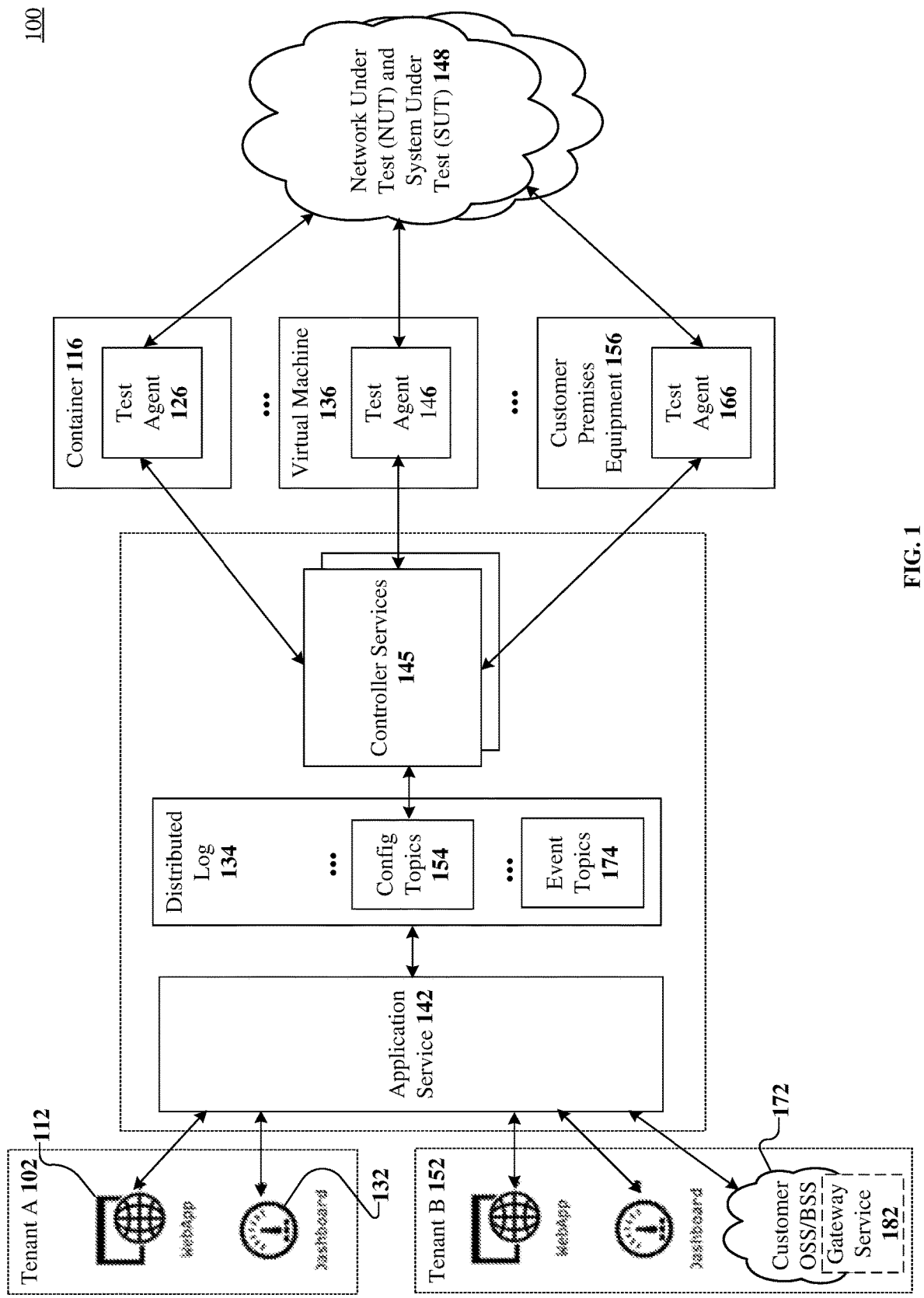
FIG. 1 shows example architecture for managing test agents and performance of multi-agent tests by the test agents distributed over a network that has tens of thousands of network nodes, according to one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Modern large enterprises operate wide-ranging networks distributed across thousands of branch offices with complicated modern networking with multiple overlays and underlays of technology. These networks connect multiple data centers distributed around the country, as well as branch offices and remote offices, smaller than branch offices, and individual people working at home. The layers and level of complexity for dynamically changing networks drive the need for effective ongoing monitoring and testing of networks, utilizing many test agents, readily deployable on a variety of different platforms.

Acronyms

Acronyms used in this disclosure are identified the first time that they are used. These acronyms are terms of art, often used in standards documents. Except where the terms are used in a clear and distinctly different sense than they are used in the art, we adopt the meanings found in wireless standards. For the reader's convenience, many of them are listed here:

| | |
|---|---|
| CPE | Customer Premises Equipment |
| FSM | Finite State Machine |
| NTP | Network Time Protocol |
| OSS/BSS | Operations Support System/ Business Support System |
| RPC | Remote Procedure Call |
| SUT | System Under Test |
| TCP | Transmission Control Protocol |
| TLS | Transport Layer Security |
| UDP | User Datagram Protocol |
| ULID | Universally Unique Lexicographically Sortable Identifier |
| URN | Uniform ResourceName |
| VM | Virtual Machine |

The disclosed technology solves a significant problem at the intersection of two domains: distributed systems and network testing. Application services specify tests and analytic services process results from test agents running on network nodes that respond to test specifications and generate results. The disclosed system manages test agents and performance of multi-agent tests by the test agents distributed over a network that can have tens of thousands of network nodes, positioning service based controllers between the application services and analytic services and the test agents.

In the disclosed system, test agents participating in the same test do not need to be connected to the same instance of the controller service. Instead, controller services coordinate the test for multiple test agents, communicating between themselves, as necessary. This property allows controller services to scale horizontally, which in turn enables large scale deployments of test agents. Each test agent calls home after deployment to connect with an available controller, but not any specific controller. A controller relays test specifications and results, between the application service and connected test agents, and commands start and abort of testing. Test agents participating in the same test also do not need to establish control connections between themselves. This is important because system under test (SUT) configuration and policy may preclude such control connections. Instead, test agents exchange test traffic only, typically emulating end user traffic which is allowed by the network.

In a test with two or more test agents, one test agent is a primary agent and the participating test agents are peer agents. Test agents can participate in multiple tests and have different roles in different tests. Primary and non-primary test agents have different roles in a test messaging exchange. A controller connected to the primary test agent is the primary controller. Controller coordination pub-sub messaging connections are between a primary controller and non-primary peer controllers. Test control connections are between controllers and peer test agents. Peer test agents exchange test traffic and not commands to start or abort testing.

The disclosed system is resilient to network partitions and other temporary faults. While there is no solution to the problem of a completely offline test agent, if an agent temporarily loses its connection to the controller service and reconnects, then normal operations can continue. Per test, the primary controller runs a primary coordination finite state machine (FSM). Per test, the non-primary peer controllers run instances of the peer controller FSM. The primary coordination FSM and instances of the peer controller FSM are restartable, following a reconciliation process. Per test, the test agents run instances of a test agent FSM. The primary coordination FSM manages a coordination protocol for tracking which non-primary peer controllers are controlling respective peer agents and for activating the primary and non-primary agents, including distributing the primary test agent's parameters. Activating the respective peer controllers includes learning peer-to-peer connection parameter requirements of respective peer test agents and distributing to the peer test agents the connection parameter requirements of the respective peer test agents. The disclosed system is resilient to connection loss, dropped messages and other similar faults that may occur during test coordination or after the test has started.

The disclosed controller service scales horizontally. In cases in which the test agent temporarily loses its connection to the controller service and reconnects, the disclosed technology does not require the test agent to reconnect to the same instance of the controller service, which has real-world benefits since it would be difficult to ensure that each test agent consistently connects to the same controller service instance.

In one example use case, a 5G communications service provider sells their service to a maritime port facility with 200 different remote controlled cranes. The 5G service provider wants to perform in-service active monitoring by placing, atop each of the massive cranes, test agents for performing ongoing monitoring of IP quality of service measurements between the crane and the base station over the same 5G network. Video down links for monitoring activity, as well as command and control messages between port base stations and base station operators and cranes, drive the need for monitoring and testing of the 5G networks which often experience latency and intermittent failure problems. Traffic topologies vary extensively due to crane movements in this example, and IP protocols utilized can vary as well. Across the large area of the maritime port, the operators need to connect over the network to coordinate activities at scale. The disclosed system can manage the large number of test agents and monitor performance of multi-agent tests by the test agents distributed over the 5G network. The operational support can lead to reducing fault isolation time, enabling the customer to quickly understand "what's changed" and "what's different" and resolving network problems in near real time.

In another use case, a large enterprise with thousands of branch offices with complicated modern networking, and multiple overlays and underlays of technology, can have five or more data centers around the country, as well as remote offices, smaller than branch offices, in addition to people working at home. The enterprise can be their own service provider, and they can also buy underlying services from network service providers. When the dynamically changing enterprise system has connectivity problems or performance issues, it is challenging for them to know where to begin to isolate faults, due to layers and levels of complexity. Using the disclosed technology, test agents can be positioned around the edges of that network and can run tests end to end. For example, a low data rate, unobtrusive test can be instantiated to monitor the quality of the data path from one point to an end point on a far side of the system, on a path through the network, hop by hop, with test agents placed along the data path. Tests can be used to isolate an issue around a particular node of the outer network layer and inner network layer, with test access at different layers along that path, segment by segment instead of end to end, for near real time fault isolation.

In the disclosed system any test agent can lose a connection, during a running test, to its initial controller and reconnect to a new controller, distinct from the initial controller. This can be due to the initial controller crashing or to a loss in connectivity, rather than the particular peer test agent crashing. Upon the reconnect to the new controller, the new controller reports to the application service the reconnect and performs a reconciliation. For running tests in which the particular test agent is a primary test agent, the new controller instantiates a new primary coordination FSM, sets states of the new FSM, proceeds with coordinating the test, and proceeds with relaying messages between the application service and the particular agent that has reconnected. For running tests in which the particular agent is a peer agent, the new controller instantiates a new peer coordination FSM, sets states of the new peer coordination FSM, coordinates with the primary coordination FSM, and proceeds with relaying messages between the application service and the particular agent that has reconnected.

The disclosed system supports one-armed test cases in which a single test agent acts alone, and two-armed test cases in which multiple test agents act in concert, with no theoretical limit to the number of test agents that can participate in the same test. We describe an architecture for enabling topology-aware active measurement of physical networks, virtualized infrastructure networks, cloud platforms, data access networks and services next.

Architecture

FIG. 1 shows example architecture 100 for managing test agents and performance of multi-agent tests by the test agents distributed over a network that has many thousands of network nodes. Because FIG. 1 is an architectural diagram, certain details are intentionally omitted to improve clarity of the description. The discussion of FIG. 1 are organized as follows. First, the elements of the figure will be described, followed by their interconnections. Then, the use of the elements in the system will be described in greater detail.

For architecture 100, tenants 102, 152 connect to an application (app) service 142 with distributed log 134 and controller services 145 connect to test agents 126, 146, 166 that monitor and test networks under test (NUT) and systems under test (SUT) 148. Tenant A 102 uses WebApp 112, a web-based user interface (UI), and dashboard 132 for interacting with app service 142 for operations, administration and maintenance. Tenant B 152 includes optional gateway 182 for actively bridging customer operations support systems (OSS) and business support systems (BSS) 172 via app service 142 APIs, in addition to Web Apps and dashboards. App service 142 is an application service that specifies tests and processes results. An analytics app (not shown) can analyze and report results for processed results in some implementations. Distributed log 134, with config topics 154 and event topics 174, supports flexible messaging and data exchange between app service 142 and controller services 145 via a producer/consumer structure. Distributed log 134 utilizes a Pub/Sub asynchronous messaging service to decouple services that produce events from services that process events. Producers broadcast global test configurations as config topics 154 and controller services 145 listen to broadcasts and consume the global test configs. When multiple controller services 145 are deployed, all the controllers consume the same global test config, learning the same things at the same time. Kafka is used for the Pub/Sub messaging and delivery of configurations, in one implementation. A different distributed log with a fast persisted fault-tolerant Pub/Sub and queue-based messaging system could be used in another implementation. Controller services 145 relays test specifications between app service 142 and connected test agents 126, 146, 166, based on config messages consumed from distributed log 134 and produces test agent results in event topics 174 in distributed log 134. Controller services 145 are centrally hosted services that implement scheduling, coordination, command, and control for widely distributed test agents 126, 146, 166 for testing networks and systems under test 148 in architecture 100, with multiple instances of controller services 145 for avoiding single points of failure and for horizontal scaling. Test agents 126, 146, 166 are software processes that are typically widely distributed throughout the System Under Test (SUT) 148, which is a communication provider's network or large-scale enterprise network in one implementation. In one system as many as ten million agents can run twenty million tests on two hundred controllers. In another system many millions of test agents can run on fifty thousand to one hundred thousand controllers.

Continuing the description of architecture 100, test agents can be hosted on virtualized infrastructure networks, cloud platforms, data access networks and services. Test agent 126 is hosted as a user-mode process in a network element in customer premises equipment 156. In many implementations, test agents may also be hosted in a container or virtual machine or in IoT device scenarios in which the platform is very constrained and the test agent is very lightweight. Architecture 100 illustrates a system with test agent 146 hosted in virtual machine 136 and test agent 126 is hosted in container 116. In all three cases, test agents 126, 146, 166 "phone home" to trusted controller services 145 for command and control, delegating the responsibilities for management of configured tests, scheduling of tests, coordination of tests, real-time command and control over tests and real-time collection of test-related events to controller services 145. Controller services 145 manage configured tests, determining what tests each test agent will run, and scheduling when the test agents will run the tests. Controller services 145 also coordinate tests when multiple test agents are to be involved in a given test, and have real-time command and control over tests, sending specific test agent commands to prepare, start and stop tests. Controller services 145 further collect test-related events in real time, handling progress and result events. In essence, on command from controller services 145, test agents 126, 146, 166 execute test cases to actively measure aspects of the SUT 148, producing test progress and result events that get stored in distributed log 134 event topics 164.

In a test with two or more test agents, one agent is a primary agent and the other participating test agents are peer agents. Test agents can participate in multiple tests and have different roles in different tests. Primary and peer agents have different roles in a test messaging exchange.

Figure 2:
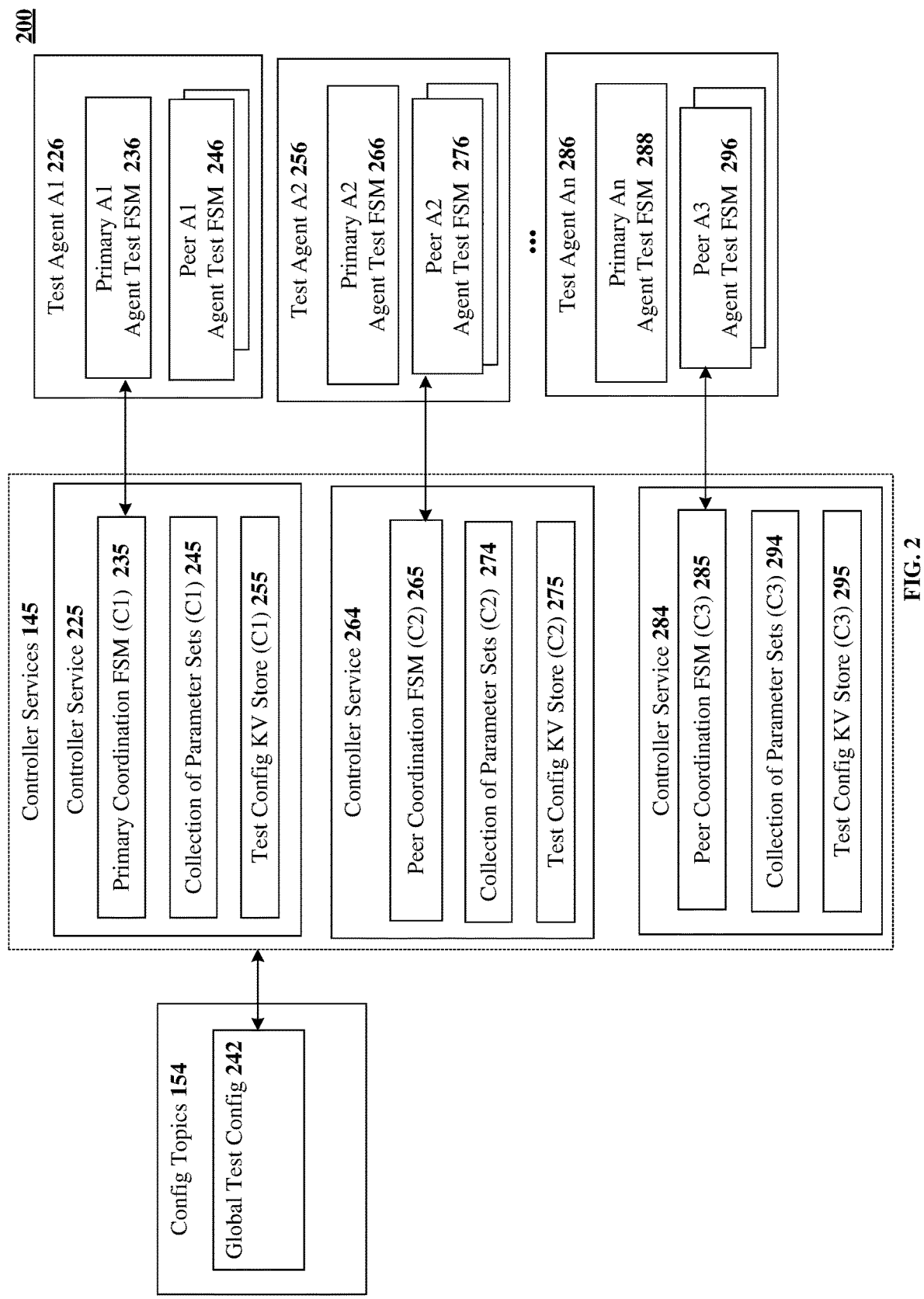
FIG. 2 shows a block diagram of components of controller services and test agents.

FIG. 2 shows a block diagram 200 of components of controller services 145 and test agents 226, 256, 286. Controller services 145 utilizes multiple instances of controller service 225, 264, 284. Controller service 225 includes primary coordination FSM 235 which connects to a test agent primary agent test FSM 236, 266, 286, and is responsible for overall coordination, producing/consuming of test coordination events. A single instance of primary coordination FSM 235 is utilized for a test. Primary coordination FSM 235 commands the primary test agent FSM, and observes test progress events from primary test agent FSM 236. Controller service 225, 264, 284 also each have a collection of parameter sets 245, 274, 294, and test configuration KV store 255, 275, 295 with values of global test config 242 broadcast via config topics 154. Global test config 242 may utilize one gigabyte of storage in an example system with ten million agents that can run twenty million tests on two hundred controllers. In another system, millions of tests can be handled on fifty thousand to one hundred thousand controllers.

Controller services 145 also has instances of controller service 264, 284 with instances of peer coordination FSM 265, 285 that produce and consume test coordination events and command peer agent test FSMs 276, 296. Peer coordination FSM 265, 285 observe test progress events from peer agent test FSM 276, 296 respectively. Since controller services 145 consume their own test coordination events, the peer FSMs need not be connected to the same controller service as the primary agent test FSM. A peer coordination FSM produces/consumes test coordination events and commands for a single peer test agent, observing test progress events from this peer test agent. peer agent test FSMs 276, 296 are instantiated in test agents, with one instance per test id/test run id, execute commands on behalf of a coordination FSM and stream test-related events.

Continuing the description of block diagram 200, primary coordination FSM (C1) 235 manages a coordination protocol for tracking which peer coordination FSMs 265, 285 are controlling respective peer agent test FSMs 276, 296 and for activating the primary agent test FSM and peer agent test FSMs. Activating the respective peer coordination FSMs includes learning peer-to-peer connection parameter requirements of respective peer agents and distributing to the peer agents the connection parameter requirements of the respective peer agents. Primary coordination FSM 235 and peer coordination FSMs 265, 285 are restartable, following a reconciliation process.

Figure 3:
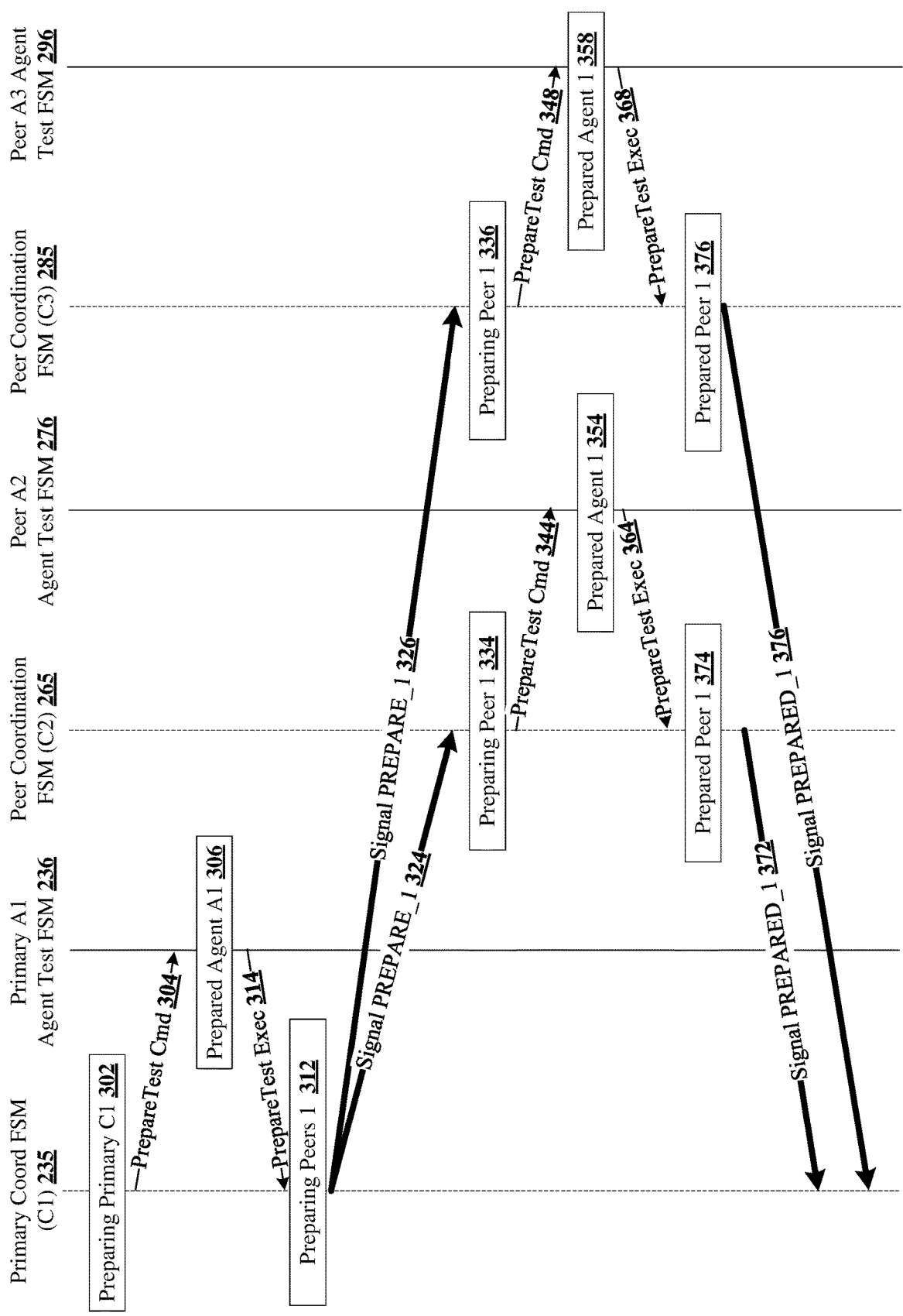
FIG. 3 illustrates the normal case for test coordination with finite state machines, via bounce diagram.
Figure 4:
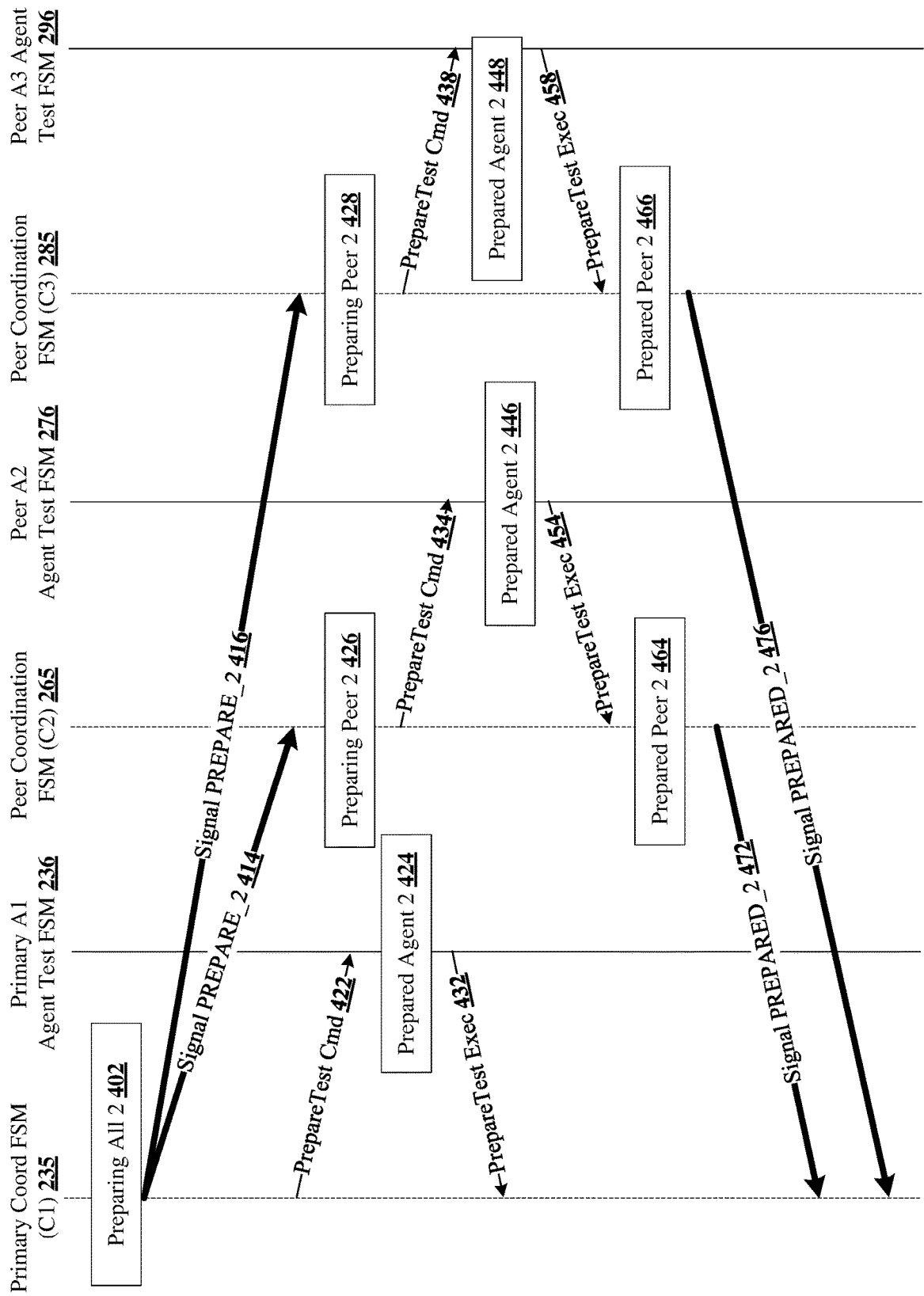
FIG. 4 shows the second round of test agent preparation, via bounce diagram.
Figure 5:
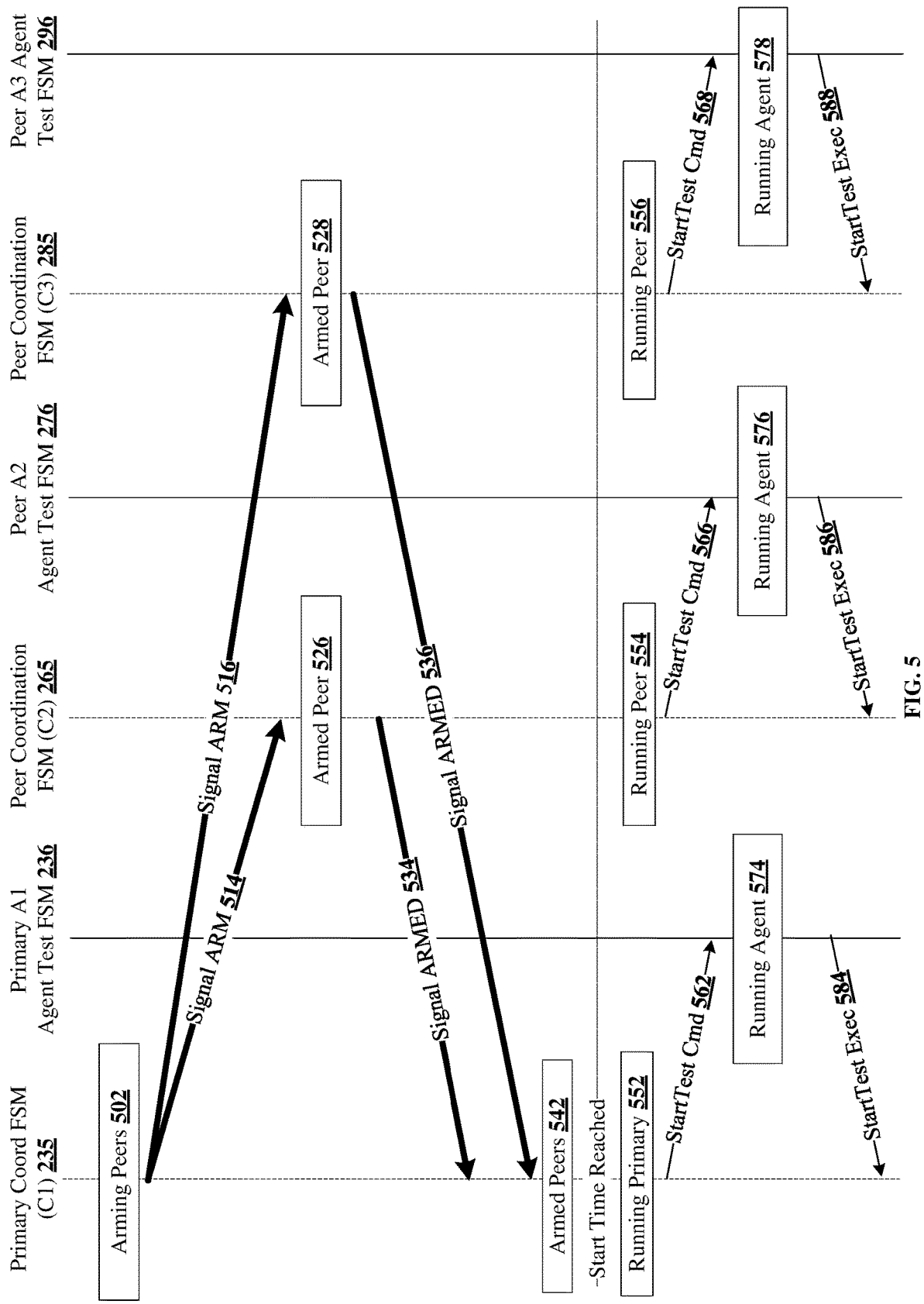
FIG. 5 shows arming and running steps for the test, via bounce diagram.

FIG. 3, FIG. 4 and FIG. 5 illustrate the "normal case" for test coordination, via bounce diagram. For preparing primary C1 302, coordination starts with primary coordination FSM (C1) 235 preparing the primary agent test FSM 236 for the test using the PrepareTest command 304. This exchange provides the primary coordinator with the initial parameter set from the test configuration. Primary A1 agent test FSM 236 allocates resources (e.g. any TCP/UDP ports that are needed to receive traffic sent by peer test agents) or to set any other parameters, at prepared agent A1 306. Primary A1 agent test FSM 236 returns its parameter set via PrepareTest Exec 314. For preparing peers 1 312, primary coordination FSM (C1) 235 coordinates with other controller services to locate the peer test agents. Peer coordination FSM (C2) 265 and peer coordination FSM (C3) 285 each fire their own test coordination events, including the respective peer parameter set. Primary coordination FSM (C1) 235 fires a test coordination event, signal PREPARE 1 324. This event contains the primary's parameter set, which also gets cached in collection of parameter sets 245. Peer coordination FSM (C2) 265, at preparing peer 1 334, prepares peer A2 using PrepareTest command 344, which results in prepared agent 1 354, and A2 responds with PrepareTest Exec 364 to achieve prepared peer 1 374. Similarly, primary coordination FSM (C1) 235 fires test coordination event, signaling PREPARE_1 326 to peer coordination FSM (C3) 285, which prepares peer A3 agent test FSM 296 using PrepareTest command 348, resulting in prepared agent 1 358, and responds with PrepareTest Exec 368 to achieve prepared peer 1 376. Each peer test agent is able to allocate resources and to set other parameters, and each peer test agent returns its parameter set in the PrepareTest execution message. Peer coordination FSM (C2) 265 and peer coordination FSM (C3) 285 each signal PREPARED_1 372, 376, including the respective peer parameter set.

FIG. 4 shows the second round of test agent preparation, via bounce diagram. Once primary coordination FSM (C1) 235 has consumed the events described above, it is ready for the second round of test agent preparation. The purpose of the second round is to flood the final collection of parameter sets to all test agents in the test. Primary coordination FSM (C1) 235 fires another test coordination event, this time signaling PREPARE_2 414 to peer coordination FSM C2 265 for preparing peer 2 426, and signaling PREPARE_2 416 to peer coordination FSM C3 285 for preparing peer 2 428 containing the finalized collection. Peer coordination FSM (C2) 265 sends PrepareTest Cmd 434 to test agent A2, resulting in prepared agent 2 446, and peer coordination FSM (C3) 285 sends PrepareTest Cmd 438 to test agent A3, resulting in prepared agent 2 448, with each containing the finalized collection of parameters. Once this second PrepareTest command is executed for any test run, that is, once the Agent Test FSM enters PREPARED_AGENT_2, the test agent is able to receive/analyze test traffic without further command from controller services which avoid any issue related to timing of Start Test commands that may be slightly skewed and in some corner cases test traffic that might arrive at the test agent before the Start Test command. Peer A2 signals prepare test exec 454 to peer coordination FSM (C2) 265, and peer A3 signals prepare test exec 458 to peer coordination FSM (C3) 285. Peer coordination FSM (C2) 265 and peer coordination FSM (C3) 285 each fire coordination events, signaling PREPARED_2. These events do not include any parameter sets since those have already been finalized.

FIG. 5 shows arming and running steps for the test, via bounce diagram. Once primary coordination FSM (C1) 235 has consumed the events described above, it calculates a start time in the near future (typically "now" plus some configurable epsilon) as the start time for the test. Primary coordination FSM (C1) 235 fires a test coordination event with signal ARM 514 (and containing the start time to peer coordination FSM (C2) 265, resulting in armed peer 526. Primary coordination FSM (C1) 235 fires a test coordination event with signal ARM 516 (and containing the start time to peer coordination FSM (C3) 285, resulting in armed peer 528. C2 and C3 positively acknowledge by firing their own ARMED signals 534, 536, resulting in armed peer test agents 542. As close to the start time as possible, primary coordination FSM (C1) 235, peer coordination FSM (C2) 265, and peer coordination FSM (C3) 285 each send Start Test commands 562, 566, 568. The test agents enter the RUNNING AGENT state 574, 576, 578 and active testing begins. A1, A2 and A3 each send start test exec 584, 586, 588 to C1, C2 and C3, respectively.

When configured, each test is assigned a globally unique testid, binding together test case URN, primary test agent URN, peer test agent URNs (0 . . . N), test mode, and test case-specific parameters. Test mode can be one of continuous, interval, cron and command. In continuous mode, the test runs continuously. In interval mode, the test runs on an interval schedule basis, such as once every 5 minutes. In cron mode, the test runs on a cron-like schedule basis, such as at a given date and time hourly or daily. In command mode, the test runs on command, that is, manually, under user control. Test configuration is immutable. That is, once a test has been configured, the test id refers to the same configuration. Changes to this configuration are structured as deletion of an existing test and re-creation of a new test, producing a new test id.

The controller service that has the primary test agent connected assigns a globally unique test run id whenever they initiate a test. This controller service maintains an invariant that there is only a single active test run per test. The test run ids are lexicographically sortable, and when sorted they are monotonically increasing Universally unique Lexicographically sortable Identifiers (ULIDs), in one implementation. In another implementation, a different set of unique test run ids could be utilized.

There is only a single test run per test. However during failure scenarios, messages/events relating to multiple test run ids may be in flight, all using the same testid. From the controller service perspective, any message that references a test run id that sorts less than the current active test run id is outdated and may be safely ignored. Some test cases require iteration, e.g. a test that steps through a range of parameters. To support these test cases, an iteration counter is maintained per test run id. The iteration counter can start at one and increases monotonically under the direction of the primary test agent, in one implementation.

Tests require parameters. Parameter structure and format are specific to individual test cases. The exact structure and format are opaque to the controller service. From the service's perspective, parameters form a set. However, because of the need to support distributed two-armed tests, the controller service and test agent cooperate to iteratively build up a collection of parameter sets. For an initial set, the immutable test configuration contains a set of parameters. During test coordination, the controller service sends this set to the primary test agent. For the primary test agent set, the primary test agent may amend the initial parameter set with its own values. The resulting set is returned to the controller service. If peer test agents are involved in the test, the controller service sends each peer a copy of the primary test agent's set. Each peer test agent may amend this set with its own values, referred to as the peer test agent set. The resulting set is returned to the controller Service. Controller services sends the collection of parameter sets (that is, the set of test agent parameter sets) to all test agents. Thus, in a two-armed test case, all test agents know all other test agents' parameters. This exchange is the primary mechanism that test agents use to learn about each other; for example, IP addresses, target port numbers, intended load, etc.

Tests produce results, whose structure and format are opaque to controller services 145. Test agents 226, 256, 286 produce test result events that flow through controller services 145 to upstream component application service 142 via distributed log 134, described above.

Test agents 226, 256, 286 initiate connection to controller services 145. Test agents are preconfigured with enough information to locate a controller service instance (e.g. a URL pointing to a specific instance, load balancer, or Kubernetes ingress), as well as with whatever information is needed to authenticate to the controller service (e.g. an API key). The test agent is connected by a load balancer to the service-based controller, in a typical implementation. One feature of the disclosed technology is that test agents may connect to any controller service instance. In the case of multiple connections over time (i.e. connection and then reconnection), the test agent is not required to reconnect to the same controller service instance. This invariant enables horizontal scale of the controller service as well as flexible load balancing strategies.

The test agent strives to be continuously connected to an instance of the controller service. If this connection cannot be established, it is retried using exponential backoff and retry timing. If the connection is fully established and then aborted, it is retried immediately without backoff. Loss of controller service connection does not cause a reset of the test agent's internal state.

The connection of a test agent to a controller uses a remote procedure call (RPC) style interface whose semantics are that the connection initiator (i.e. the test agent client) invokes RPCs on the connection listener (i.e. the controller service service). It is not possible to reverse this calling convention. As a result, all RPCs are initiated by the test agent to the controller service. Even though RPC semantics require the test agent client to invoke methods on the controller service, command-and-control intelligence is vested in the controller service. This principle follows from the reality that test agent deployments may be long-lived and it is easier to upgrade controller services than widely distributed test agents. After establishing a connection, a test agent will invoke five RPC methods in an inversion of control pattern. A Hello unary method takes test agent information and returns controller service information. The controller service requires that newly connected test agents invoke this method before any others. The controller service uses information from the test agents Hello to inform its command-and-control over the test agent. The test agent uses controller service information for debug/logging only. A second RPC method is a Commands server-to-client streaming method where the controller service streams command messages to the test agent. The test agent's responsibility is to decode each command message, execute it, and return the result (or exception) using the Executions method below. In an Executions client-to-server streaming method, the test agent streams execution messages to the controller service. For each command message received via the Commands method above, the result (or exception) is encoded and returned to the controller service via this stream. In RPC method, Events client-to-server streaming, the test agent streams event messages to the controller service. As the test agent fires events, these are encoded and pushed to the controller service via this stream. A fifth RPC method is an Acks server-to-client streaming method where the Controller Server streams positive acknowledgments of received event messages to the test agent. As the controller service receives event messages, it places their ids back on this stream.

Errored Test Run Handling

In the example illustrated in the bounce diagram of FIG. 3 through FIG. 5, there are numerous opportunities for errors. Once common error case is that test agents get disconnected from their controller service, for any reason. If this occurs before the running agent state 574, 576, 578 is reached and the test agent can reconnect within the coordination FSM timeout period, then coordination can continue via disclosed restartable coordination FSM mechanisms, described in detail below. Once the running agent state 574,576,578 has already been reached, prolonged test agent disconnects do not result in aborted tests. If disconnects, crashes or other scenarios result in errors that restartable FSMs cannot handle, then the primary coordination FSM will terminate in the ERRORED_PRIMARY state. In these cases, recovery depends on the test mode. In continuous mode, the test is retried with a new instance of the primary coordination FSM (i.e. with a new test run id). This retry may be subject to an exponential backoff delay. For interval mode and cron mode, a new test run will be started according to the configured schedule. In command mode, handling depends on application service 142, or other components that sent the original Controller Service Start Test command.

On connect to controller service, after accepting a test agent connection, the controller service has no model for test agent state. It must query this state and then reconcile vs. test configs. Reconciliation includes the following steps. The controller service sends 'StopAllTestsExcept' ignoring configured and enabled test ids, i.e. tests that should or could be running. This stops tests that may have been deleted or disabled while the test agent was disconnected. The connection-interrupted test agent continues to conduct the currently active tests and directs results of the currently active tests to the second service-based controller without need to tear down and restart the currently active tests. The controller service sends a 'GetAllTests' command. For each running test, the service starts an instance of the primary or peer coordination FSM, as appropriate. The initial states of the FSMs are based on the test state as reported as a result of the 'GetAllTests' execution. For each 'Continuous' mode test that is configured with the test agent as primary, that is enabled, but is not running, that test is started. Other mode tests will be started according to their schedules or on command. Post-reconciliation, the controller service has a model for the test agent state, and that state matches the test configurations. Coordination FSMs manage test runs thereafter.

On test configuration, the controller services consume test configurations from a config topic, via Kafka or equivalent pub/dub system, and cache this state locally. When a test is configured as enabled, if any controller service has the test's primary test agent currently connected it generates a new test run id and starts an instance of the primary coordination FSM. If the primary test agent is currently disconnected, it will be configured when it reconnects, as described above.

On test disabled, the controller services consume a disabled test configuration from a Kafka config topic and update their local cache to record that the test is disabled. If any controller service has a running primary/peer coordination FSM for the disabled test, the FSM is aborted. The FSMs send 'Stop Test' commands as part of their shutdown.

On test deletion, controller services consume a test config tombstone from a Kafka config topic and update their local cache, deleting the config. If any controller service has a running primary/peer coordination FSM for the deleted test, the FSM is aborted. The FSMs send 'Stop Test' as part of their shutdown.

On test coordination event, the controller services consume test coordination events from a broadcast-style Kafka event topic, including their own events. If a controller service receives a coordination event from a controller service running the primary coordination FSM and has the test's peer test agent currently connected, it starts an instance of the peer coordination FSM.

For a given test run, test coordination events originating from a primary coordination FSM are dispatched to run peer coordination FSMs. The test coordination events originating from a peer coordination FSM are dispatched to the running primary coordination FSM. The agent test FSM, primary coordination FSM and peer coordination FSM are illustrated and described next.

Figure 6:
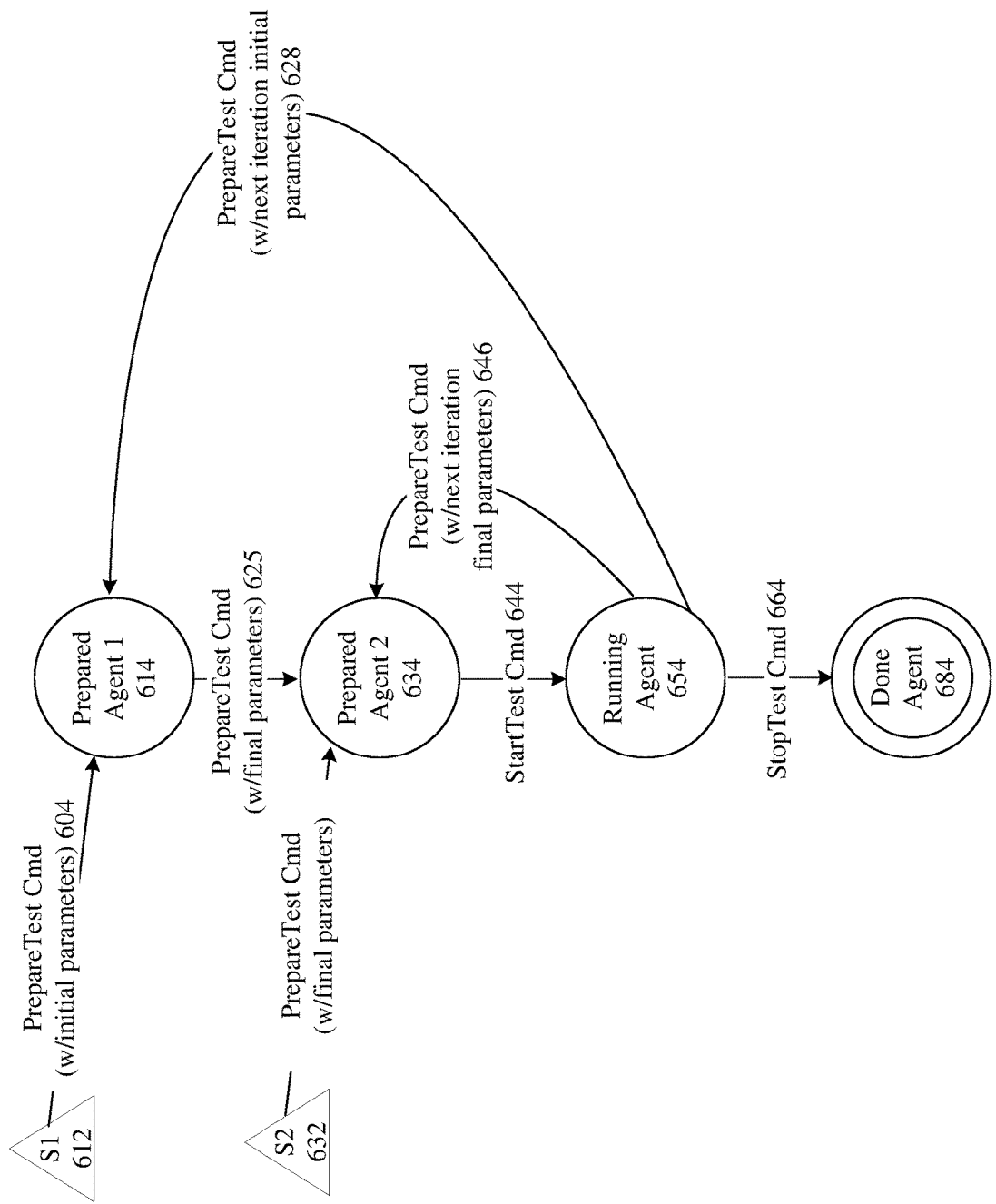
FIG. 6 illustrates an example disclosed agent test finite state machine.

FIG. 6 illustrates states and transitions for an example disclosed agent test finite state machine (FSM). An agent test FSM is instantiated in each test agent with one instance per test id/test run id. Agent test FSM executes commands on behalf of a coordination FSM, and streams test-related events. A coordination FSM invokes agent test FSM via PrepareTest Cmd with initial parameters 604 represented as starting state S1 612. Prepared agent 1 614 signals PrepareTest Cmd with final parameters 625, which are consolidated and represented as state S2 632, in preparation for starting a test. PrepareTest Cmd gets invoked once for a one-armed test and twice for a two-armed test. The second invocation provides the consolidated collection of parameter sets. Prepared agent 2 634 is in a state of readiness to start a test, via Start Test Cmd 644, leading to running agent 654. Three potential next steps from running agent 654 are (a) PrepareTest Cmd with next iteration final parameters 646, (b) PrepareTest Cmd with next iteration initial parameters 628 and (c) Stop Test Cmd 664, which stops a test, resulting in done agent 684 state. A Stop All Tests Cmd (not shown) stops all tests, optionally except a specified set of tests specified by their test ids. A Get All Tests Cmd (not shown) returns the test id, test run id, test iteration, test case URN, test role (primary/peer), test state, and the test agent's parameter set for each test that is active on the test agent.

Figure 7:
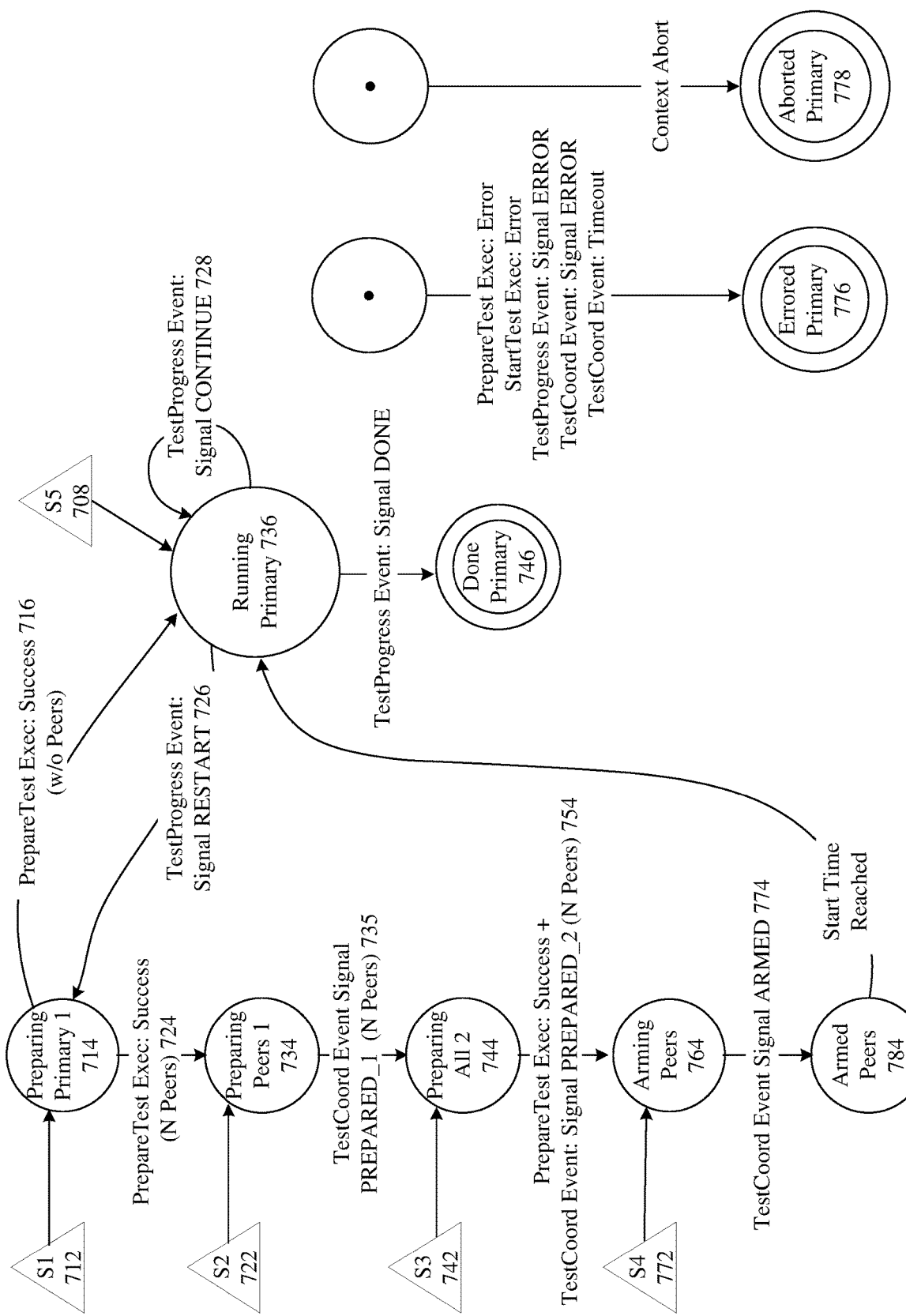
FIG. 7 illustrates an example disclosed primary coordination finite state machine.

FIG. 7 illustrates states and transitions for an example primary coordination finite state machine (FSM). Disclosed coordination finite state machines are designed to be restartable. Primary coordination FSM 235 in controller service 225, a service in controller services 145, has primary test agent FSM 236 connected. For any test at most one instance of primary coordination FSM is responsible for overall coordination for the respective primary test agent FSM. Primary coordination FSM 235 produces/consumes test coordination events and commands primary test agent FSM 236, and primary coordination FSM 235 observes test progress events from primary test agent FSM 236 only. Primary coordination FSM 235, in preparing primary 1 714 state, starts with state S1 712, and can follow a branch with no peer FSMs or a branch with N peers. PrepareTest Exec: Success (without peers) 716 steps to running primary 736 with state S5 708. The other branch, PrepareTest Exec: Success (N peers) 724 steps to preparing peers 1 734 with state S2 722. Continuing the branch with N peers, Test Coord Event Signal PREPARED_1 (N peers) 735 steps to preparing all 2 744 with state S3 742. Prepare Test Exec Success+Test Coord Event Signal PREPARED_2 (N peers) 754 further steps to arming peers 764 with state S4 772 for running the agent with peers. Test Coord Event Signal ARMED 774 steps to armed peers 784, and when start time is reached, steps to running primary 736, which stays in this state while Test Progress Event signal CONTINUE 728 is active, and alternatively, when Test Progress Event Signal RESTART 726, steps to Preparing Primary 1 714 to begin the process for anew. When Test Progress Event Signal DONE from running primary 736, the FSM steps to Done Primary 746. For errors during test preparation and coordination, including Prepare Test Exec: Error, Start Test Exec:

Error, Test Progress Event: Signal ERROR, Test Coord Event: Signal ERROR, and Test Coord Event: Timeout, FSM enters errored primary state 776. If Context Abort is received in a Test Progress event, FSM enters aborted primary 778.

Figure 8:
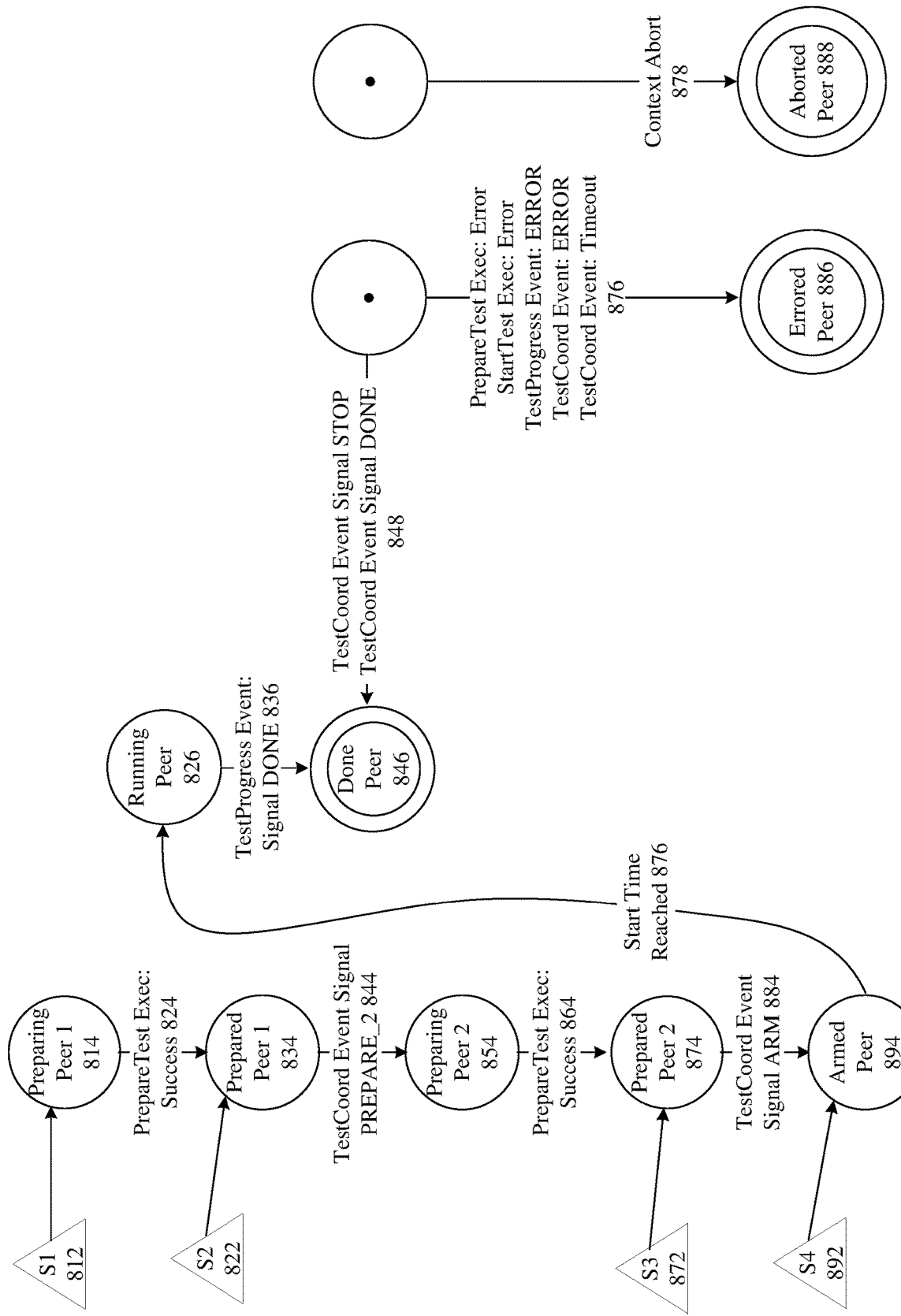
FIG. 8 illustrates an example disclosed peer coordination finite state machine.

FIG. 8 illustrates states and transitions for an example disclosed peer coordination finite state machine (FSM). Peer coordination FSMs are instantiated in controller service, with one instance per peer agent test FSM. Since all controller services consume their own test coordination events, multiple peer coordination FSMs can be connected to the same controller service as the primary coordination FSM, or each distinct peer coordination FSM can be connected to distinct controller services. The peer coordination FSM, produces/consumes test coordination events and commands a single peer test agent, and observes test progress events from this peer test agent only. Peer coordination FSM is initialized to state preparing peer 1 814 with state S1 81.2 Prepare Test Exec Success 824 steps to prepared peer 1 834 with state S2 822. Test Coord Event Signal Prepare 2 844 leads to preparing peer 2 854. Prepare Test Exec Success 864 leads to prepared peer 2 874 with state S3 872. Test Coord Event Signal ARM 884 leads to armed peer 894 with state S4 892. When start time is reached 876, the state transitions to running peer 826, and when test progress event signals done 836, the state transitions to done peer 846.

The disclosed technology for managing numerous test agents and performance of multi-agent tests involving exchanges among the test agents running on thousands of widely distributed nodes has been implemented in the Go programming language and tested. The core of the invention is also described by a formal specification written in the TLA+/PlusCal languages and used to check that the disclosed technology performs in three scenarios: one agent, with disconnects, two agents, with disconnects, and three agents, without disconnects. See TLA example in the text file in Appendix A: TLA Program Listing Appendix 02.11.2021 (99 KB).

A computer system is described next, for managing numerous test agents and performance of multi-agent tests involving exchanges among the test agents running on thousands of widely distributed nodes.

Computer System

Figure 9:
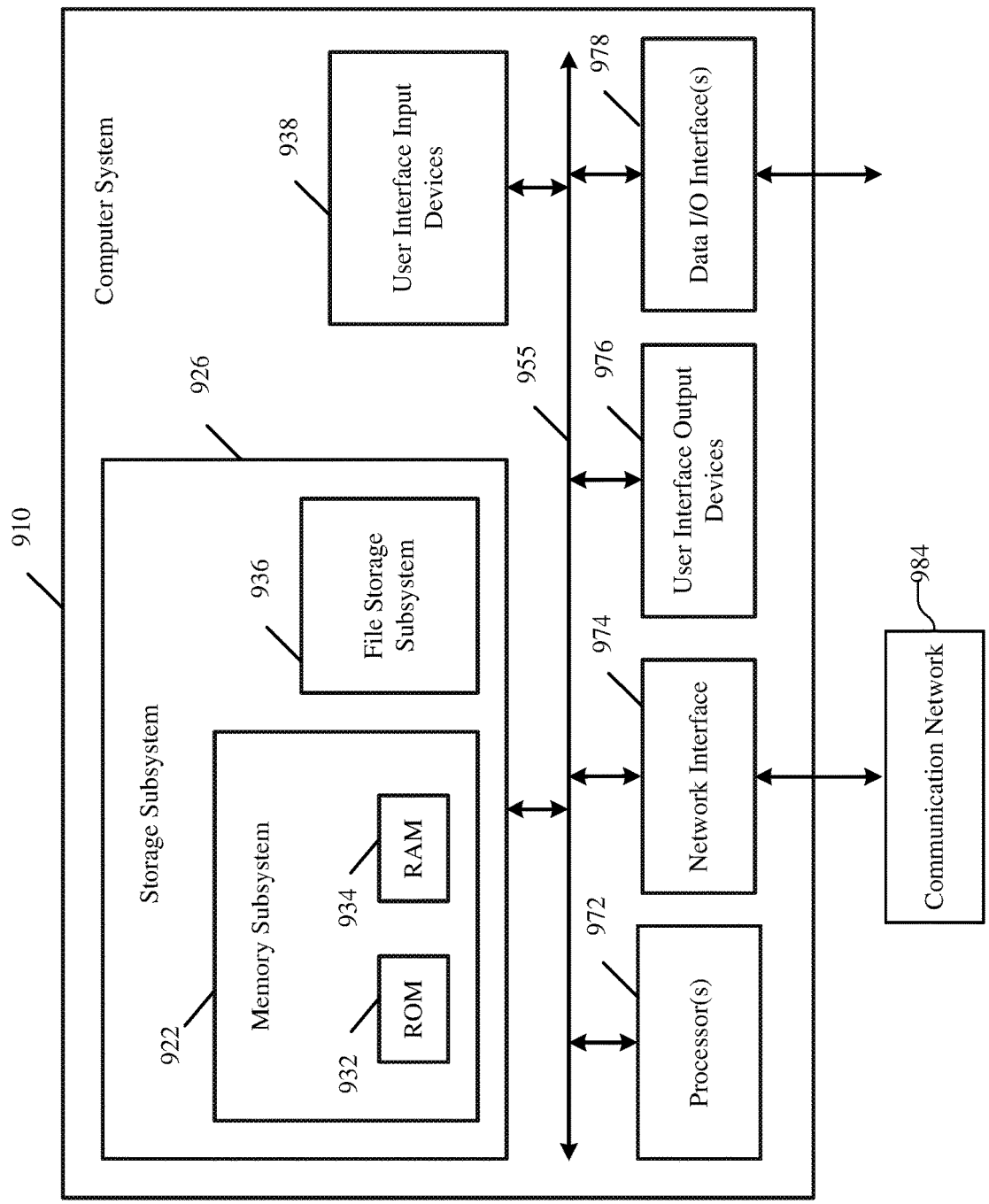
FIG. 9 illustrates a simplified block diagram of a computer system that can be used to manage numerous test agents and performance of multi-agent tests involving exchanges among the test agents running on thousands of widely distributed nodes, according to one embodiment of the disclosed technology.

FIG. 9 is a simplified block diagram of a computer system 910 that can be used to manage numerous test agents and performance of multi-agent tests involving exchanges among the test agents running on thousands of widely distributed nodes. Computer system 910 includes at least one central processing unit (CPU) 972 that communicates with a number of peripheral devices via bus subsystem 955. These peripheral devices can include a storage subsystem 926 including, for example, memory devices and a file storage subsystem 936, user interface input devices 938, user interface output devices 976, and a network interface subsystem 974. The input and output devices allow user interaction with computer system 910. Network interface subsystem 974 provides an interface to outside networks, including an interface to corresponding interface devices in a communication network 984 with other computer systems.

In one implementation, the tenants of FIG. 1 can be communicably linked to the storage subsystem 926 and the user interface input devices 938. User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 926 stores programming and data constructs that provide the functionality of some or all of the modules and methods described herein. Memory subsystem 922 used in the storage subsystem 926 can include a number of memories including a main random access memory (RAM) 934 for storage of instructions and data during program execution and a read only memory (ROM) 932 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 926, or in other machines accessible by the processor.

Bus subsystem 955 provides a mechanism for letting the various components and subsystems of computer system 910 communicate with each other as intended. Although bus subsystem 955 is shown schematically as a single bus, alternative implementations of the bus subsystem can use multiple busses.

Computer system 910 itself can be of varying types including a personal computer, a portable computer, a workstation, a computer terminal, a network computer, a television, a mainframe, a server farm, a widely-distributed set of loosely networked computers, or any other data processing system or user device. Due to the ever changing nature of computers and networks, the description of computer system 910 depicted in FIG. 9 is intended only as a specific example for purposes of illustrating the preferred embodiments of the present invention. Many other configurations of computer system 900 are possible having more or less components than the computer system depicted in FIG. 9.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Particular Implementations

We describe some particular implementations and features usable to manage numerous test agents and performance of multi-agent tests involving exchanges among the test agents running on a widely distributed network of nodes next.

In one implementation, a disclosed method of using service-based controllers, includes a first service-based controller and a second service-based controller, to manage numerous test agents and performance of multi-agent tests involving exchanges among the test agents running on a widely distributed network of nodes. The disclosed method includes a connection-interrupted test agent that is running a plurality of the multi-agent tests losing connection to the first service-based controller, calling home after the loss of connection, and being connected to the second service-based controller. The method also includes the second service-based controller, after being connected to the connection-interrupted test agent, accessing a list of currently active tests, which the connection-interrupted test agent should be running, directing the connection-interrupted test agent to stop running at least tests that are not on the list of currently active tests, if any, and receiving from the connection-interrupted test agent a state report on at least running tests that are on the list of currently active tests. The disclosed method further includes instantiating fresh primary and peer coordination finite state machines (FSMs) and setting states of the fresh primary and peer coordination FSMs using the state report received from the connection-interrupted test agent, and establishing coordination interactions with additional service-based controllers of additional test agents that are participating with the connection-interrupted test agent in the currently active tests. The method additionally includes the connection-interrupted test agent continuing to conduct the currently active tests and directing results of the currently active tests to the second service-based controller without need to tear down and restart the currently active tests.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Some implementations of the disclosed method include between 100,000 and 10,000,000 test agents distributed over the network. In some cases, the disclosed method includes an average of between 50,000 and 1,000,000 test agents per service-based controller deployed over the widely distributed network. In one implementation, ten million test agents run twenty million multi-agent tests.

Many implementations of the disclosed method including at least one application service interacting with the controllers, specifying tests and establishing the list of currently active tests, and processing results reported from the tests. In some cases, analytics applications can receive and process results of tests from the test agents.

One implementation of the disclosed method includes the second service-based controller directing the connection-interrupted test agent to newly start at least one test that is on the list of currently active tests but not running on the connection-interrupted test agent. In some implementations, the connection-interrupted test agent is a primary test agent in the newly started test, instantiating a new primary coordination FSM. In other instances, the connection-interrupted test agent is a peer test agent in the newly started test, instantiating a new peer coordination FSM. Some implementations of the disclosed method also include the service-based controllers interacting with the test agents controlling and coordinating the tests running on the test agents. The disclosed method can further include the service-based controllers passing test results from the test agents to the application service. In some implementations of the disclosed method, the test agent is connected by a load balancer to the service-based controller.

A tangible non-transitory computer readable storage medium impressed with computer program instructions that, when executed on a processor, cause the processor to implement the methods described above.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In one implementation, a disclosed system includes numerous processors each coupled to memory, the memory loaded with computer instructions, configured as test agents and service-based controllers distributed over a widely distributed network, comprising the test agents configured to respond to test specifications for multiple tests and to generate results. the service-based controllers coupled in communication over the network with the test agents, and at least one test specification that involves two or more agents, in which one agent is a primary agent and one or more other participating agents are peer agents, wherein the primary agent leads the test. Each disclosed test agent is configured to call home after being deployed, upon commencing operation, be connected to a service-based controller, responsive to calling home, and receive a specification of tests for the test agent to run, the specification identifying the test agent as a primary agent or peer agent for each of the tests. For each disclosed service-based controller, for each test in which a test agent coupled to the controller, in which the test agent is identified as the primary agent, the service-based controller is configured to instantiate a restartable primary coordination finite state machine (FSM) and in which the test agent is identified as the peer agent, the service-based controller is configured to instantiate a restartable peer coordination FSM that has at least some different states than the primary coordination FSM, and is configured to deliver to the test agent the test specification.

Some implementations of the disclosed system further include each service-based controller passing test results from the test agents to the application service.

For some implementations of the disclosed system, fresh primary coordination and peer coordination finite state machines configurable on at least one of the service-based controllers are restartable, upon reconnection of a connection interrupted test agent, using state information for respective tests retrievable from the connection interrupted test agent to instantiate the fresh primary coordination and peer coordination finite state machines.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options.

We claim as follows:

1. A method of using service-based controllers, including a first service-based controller and a second service-based controller, to manage numerous test agents and performance of multi-agent tests involving exchanges among the test agents running on a distributed network of nodes, the method including:
- a connection-interrupted test agent that is running a plurality of the multi-agent tests:
  - losing connection to the first service-based controller;
  - calling home after the loss of connection; and
  - being connected to the second service-based controller;
- the second service-based controller, after being connected to the connection-interrupted test agent:
  - accessing a list of currently active tests, which the connection-interrupted test agent should be running;
  - directing the connection-interrupted test agent to stop running at least tests that are not on the list of currently active tests, if any;
  - receiving from the connection-interrupted test agent a state report on at least running tests that are on the list of currently active tests;
  - instantiating fresh primary and peer coordination finite state machines (abbreviated FSMs) and setting states of the fresh primary and peer coordination FSMs using the state report received from the connection-interrupted test agent; and
  - establishing coordination interactions with additional service-based controllers of additional test agents that are participating with the connection-interrupted test agent in the currently active tests; and
- the connection-interrupted test agent continuing to conduct the currently active tests and directing results of the currently active tests to the second service-based controller without need to tear down and restart the currently active tests.

2. The method of claim 1, further including between 100,000 and 50,000,000 test agents distributed over the network.

3. The method of claim 1, further including an average of between 50,000 and 1,000,000 test agents per service-based controller deployed over the network.

4. The method of claim 1, further including at least one application service interacting with the second service-based controller, specifying tests and establishing the list of currently active tests, and processing results reported from the specified tests.

5. The method of claim 4, further including the second service-based controller passing test results from the test agents to the application service.

6. The method of claim 1, further including the second service-based controller directing the connection-interrupted test agent to newly start at least one test that is on the list of currently active tests but not running on the connection-interrupted test agent.

7. The method of claim 6, wherein the connection-interrupted test agent is a primary test agent in the newly started test, instantiating a new primary coordination FSM.

8. The method of claim 6, wherein the connection-interrupted test agent is a peer test agent in the newly started test, instantiating a new peer coordination FSM.

9. The method of claim 1, further including a plurality of the service-based controllers interacting with the test agents controlling and coordinating the tests running on the test agents.

10. The method of claim 1, wherein the test agents are connected by a load balancer to the service-based controllers.

11. A system including numerous processors each coupled to memory, the memory loaded with computer instructions, configured as test agents and service-based controllers distributed on a widely distributed network of nodes, comprising:
- the test agents configured to respond to test specifications for multiple tests and to generate results;
- the service-based controllers coupled in communication over the widely distributed network of nodes with the test agents; and
- at least one test specification that involves two or more agents, in which one agent is a primary agent and one or more other participating agents are peer agents, wherein the primary agent leads at least one specified test;
- wherein each test agent is configured to:
  - call home after being deployed, upon commencing operation;
  - be connected to a service-based controller, responsive to calling home; and
  - receive a specification of tests for the test agent to run, the specification identifying the test agent as a primary agent or peer agent for each of the specified tests; and
- wherein each service-based controller, for each specified test in which a test agent is coupled to the service-based controller:
  - in which the test agent is identified as the primary agent, the service-based controller is configured to instantiate a restartable primary coordination finite state machine (abbreviated FSM); and
  - in which the test agent is identified as the peer agent, the service-based controller is configured to instantiate a restartable peer coordination FSM that has at least some different states than the restartable primary coordination FSM; and
  - is configured to deliver to the test agent the test specification.

12. The system of claim 11, further including at least one application service interacting with the service-based controllers, wherein the application service specifies tests and processes results reported from the tests specified by the application service.

13. The system of claim 12, further including each service-based controller passing test results from the test agents to the application service.

14. The system of claim 11, further including each service-based controller controlling and coordinating multiple tests running on the test agents.

15. The system of claim 11, wherein the test agent is connected by a load balancer to the service-based controller.

16. The system of claim 11, wherein fresh primary coordination and peer coordination finite state machines configurable on at least one of the service-based controllers are restartable, upon reconnection of a connection interrupted test agent, using state information for respective tests retrievable from the connection interrupted test agent to instantiate the fresh primary coordination and peer coordination finite state machines.

17. A tangible non-transitory computer readable storage medium comprising computer program instructions that, when executed on a processor, cause the processor to implement actions of using service-based controllers, including a first service-based controller and a second service-based controller, to manage numerous test agents and performance of multi-agent tests involving exchanges among the test agents running on widely distributed network nodes, the actions including:

a connection-interrupted test agent that is running a plurality of the multi-agent tests:
  losing connection to the first service-based controller;
  calling home after the loss of connection; and
  being connected to the second service-based controller;
the second service-based controller, after being connected to the connection-interrupted test agent:
  accessing a list of currently active tests, which the connection-interrupted test agent should be running;
  directing the connection-interrupted test agent to stop running at least tests that are not on the list of currently active tests, if any;
  receiving from the connection-interrupted test agent a state report on at least running tests that are on the list of currently active tests;
  instantiating fresh primary and peer coordination finite state machines (abbreviated FSMs) and setting states of the fresh primary and peer coordination FSMs using the state report received from the connection-interrupted test agent; and
  establishing coordination interactions with additional service-based controllers of additional test agents that are participating with the connection-interrupted test agent in the currently active tests; and
  the connection-interrupted test agent continuing to conduct the currently active tests and directing results of the currently active tests to the second service-based controller without need to tear down and restart the currently active tests.

18. The tangible non-transitory computer readable storage medium of claim 17, further including the second service-based controller directing the connection-interrupted test agent to newly start at least one test that is on the list of currently active tests but not running on the connection-interrupted test agent.

19. The tangible non-transitory computer readable storage medium of claim 17, wherein the connection-interrupted test agent is a primary test agent in a newly started test, instantiating a new primary coordination FSM.

20. The tangible non-transitory computer readable storage medium of claim 17, wherein the fresh primary coordination FSM and the fresh peer coordination FSM are restartable; upon reconnection of a connection interrupted test agent, using state information for respective tests retrievable from the connection interrupted test agent to instantiate the fresh primary coordination FSM and the fresh peer coordination FSM.

* * * * *